(12) United States Patent
Cheng et al.

(10) Patent No.: US 6,449,488 B1
(45) Date of Patent: Sep. 10, 2002

(54) QUALITY OF SERVICE BASED CDMA BROADCAST SCHEDULER

(75) Inventors: Terry Cheng, Randolph; Sudheer A. Grandhi, Lake Hiawatha, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/382,583

(22) Filed: Aug. 25, 1999

(51) Int. Cl.[7] .................................................. H04Q 7/20
(52) U.S. Cl. ........................ 455/466; 455/503; 370/335; 340/7.3
(58) Field of Search ................................ 455/422, 466, 455/503, 517; 370/326, 336, 345, 395, 335; 340/7.26, 7.3

(56) References Cited

U.S. PATENT DOCUMENTS

| | | | |
|---|---|---|---|
| 5,530,918 A | * 6/1996 | Jasinski | 455/466 |
| 5,628,051 A | * 5/1997 | Salin | 455/466 |
| 5,729,540 A | * 3/1998 | Wegrzyn | 370/336 |
| 5,822,310 A | 10/1998 | Chennakeshu et al. | 370/336 |
| 5,842,113 A | * 11/1998 | Nanda et al. | 455/522 |
| 5,870,388 A | * 2/1999 | Yung et al. | 370/345 |
| 5,878,033 A | * 3/1999 | Mouly | |
| 5,878,038 A | 3/1999 | Willey | 370/317 |
| 5,878,351 A | 3/1999 | Alanara et al. | 455/466 |
| 6,236,656 B1 | * 5/2001 | Westerberg et al. | 370/395 |
| 6,262,980 B1 | * 7/2001 | Leung et al. | 370/336 |

FOREIGN PATENT DOCUMENTS

| EP | 0915 632 A2 | * 5/1999 |
|---|---|---|
| WO | WO 97/46035 | * 12/1997 |

* cited by examiner

*Primary Examiner*—William Trost
*Assistant Examiner*—Simon Nguyen (57) ABSTRACT

A computer implemented method and apparatus that schedules broadcast short message service (BSMS) messages in a manner that reduces the adverse impact on voice quality and system capacity, attributable to the transmission of the BSMS messages, in a wireless telecommunications system. The method and apparatus utilize a quality of service (QoS) based broadcast message scheduler to negotiate and schedule the transmission times of BSMS messages to the individual users in the system. The quality of service (QoS) based broadcast message scheduler also allows a user to tradeoff voice quality for broadcast capacity.

31 Claims, 6 Drawing Sheets

FIG. 8

QUALITY OF SERVICE BASED CDMA BROADCAST SCHEDULER

BACKGROUND OF THE INVENTION

1. Field of the Invention

The present invention relates generally to the field of telecommunications and, more particularly to a method and apparatus for providing a quality of service (QoS) based broadcast message scheduler for a CDMA wireless telecommunications system.

2. Description of the Related Art

Figure 1:
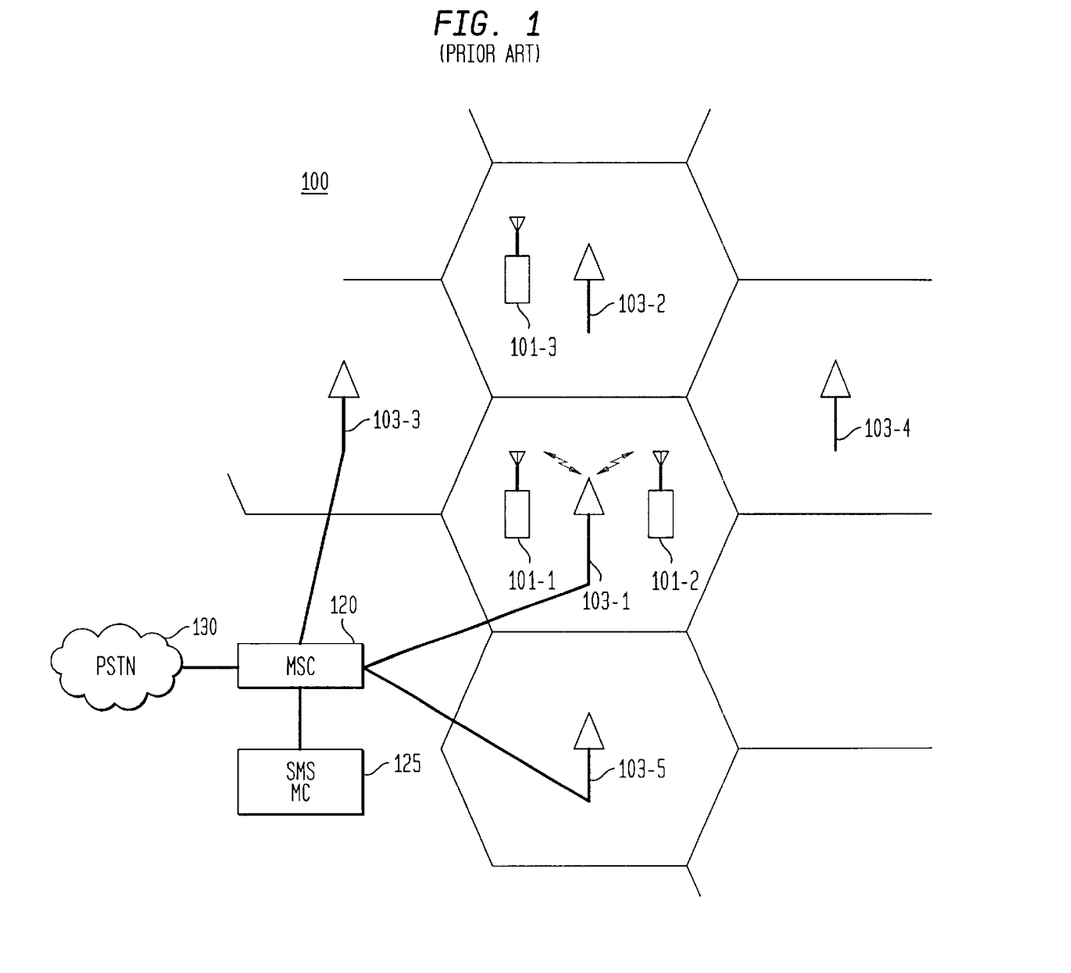
FIG. 1 is a schematic diagram illustrating a conventional CDMA wireless telecommunications system.

FIG. 1 illustrates a schematic diagram of a portion of a typical wireless telecommunications system 100 and in particular, a code division multiple access (CDMA) wireless telecommunication system. The system 100 provides wireless communication service to a number of wireless terminals 101-1, 101-2, 101-3 that are situated within a graphical region. The heart of a typical wireless telecommunications system 100 is the Mobile Switching Center (MSC) 120, which may also be known as a Wireless Switching Center (WSC) or Mobile Telephone Switching Office (MTSO). Typically, the MSC 120 is connected to a plurality of base stations 103-1, 103-2, 103-3, 103-4, 103-5 that are dispersed throughout the geographic area serviced by the system 100 and to at least one Public Switched Telephone Network (PSTN) 130. The MSC 120 is responsible for, among other things, establishing and maintaining calls between wireless terminals and between a wireless terminal and a wireline terminal (not shown), which is connected to the system through local and/or long distance networks.

The geographic area serviced by the system 100 is partitioned into a number of spatially distinct areas called "cells." In FIG. 1 each cell is schematically represented by a hexagon; in practice, however, each cell usually has an irregular shape that depends on the topology of the terrain serviced by the system 100. Typically, each cell contains a base station, such as for example base station 103-1, which includes the radios and antennas that the base station uses to communicate with the wireless terminals in that cell and also comprises the transmission equipment that the base station uses to communicate with the MSC 120.

For example, when wireless terminal 101-1 desires to communicate with wireless terminal 101-2, wireless terminal 101-1 transmits the desired information to base station 103-1, which relays the information to MSC 120. Upon receipt of the information, and with the knowledge that the information is intended for wireless terminal 101-2, the MSC 120 returns the information back to base station 103-1, which relays the information to the wireless terminal 101-2.

The MSC 120 is also connected to a short message service (SMS) message center (MC) 125. The SMS MC 125 provides SMS and broadcast short message service (BSMS) to the system 100. As known in the art, the BSMS allows the transmission of short text messages to multiple users within the system 100. When received, the text message is displayed on the user's wireless terminal. Typically, the BSMS is used by the service provider for applications such as traffic and weather advisories, news and sports reports and mass advertisements.

In a CDMA telecommunications system information is transmitted over a traffic channel in fixed units of time referred to as frames. Each frame is typically twenty milliseconds long. Speech information is coded by a vocoder and transmitted in units referred to as speech frames, which have the same duration as the traffic frames on the CDMA traffic channel. The voice process of a user comprises alternating talk-spurt and silence periods, which are respectively reflected as voice data and breaks (i.e., no data) in the voice data of the speech frames. A BSMS message is transmitted on the forward traffic channel, i.e., base station to wireless terminal channel, along with voice information.

Each BSMS message is limited in size and delivered to a user in the form of data burst messages. Typically, the BSMS message is multiplexed into the traffic frame with the voice data by what is commonly referred to as a "dim and burst" method (i.e., where, depending upon the user's vocoder mode, a minute portion of the voice data is chopped off or dimmed and the BSMS message information is used to fill in the breaks of the frame). It should be appreciated that the multiplexing of the BSMS message with speech information may be carried out in several ways depending upon the user's service requirements.

It is desirable for the service provider to transmit BSMS messages to its users. It is also desirable for the users to receive the BSMS messages from the service provider. Unfortunately, the transmission of BSMS messages in a CDMA telecommunications system is not without its shortcomings. For example, signal interference between users of the CDMA system increases when the BSMS messages are multiplexed with the voice data. That is, since the breaks in the frame are now filled with the BSMS message information, extra radio frequency (RF) transmissions are required to transmit the traffic frames with the BSMS message in comparison to the RF transmission that would have been required to transmit the frame without the BSMS message. The extra RF transmissions are further compounded by the fact that the BSMS message is being transmitted to each user in the system. The extra RF transmissions to each user causes interference with the other users in the system. This interference dramatically effects the voice quality of the CDMA system.

Moreover, system capacity is also reduced by the transmission of BSMS messages. As is known in the art, in a CDMA wireless telecommunications system a base station process commonly referred to as "power control" regulates the transmitting power of wireless terminals communicating with the base station. The power control process also regulates the number of users that a cell can support at any one time based on the amount of noise or interference present within the cell. Since a CDMA wideband channel is reused in every cell, self interference caused by other users of the same cell and interference caused by users in other cells is the most limiting factor to the capacity of the cell and thus, the CDMA system. Due to fading and other channel impairments, maximum capacity is achieved when the signal-to-noise ratio (SNR) for every user is, on the average, at the minimum point needed to support an acceptable channel performance. Based on these and other principles, power control determines whether a new user (i.e., wireless terminal) or call can be added to a cell within the system. If power control determines that a new user or call cannot be added to a cell, it prevents the user from gaining access to the cell. Thus, the increased interference associated with the transmissions of the BSMS messages can also reduce the capacity of the CDMA telecommunications system.

Ensuring that a CDMA system operates to its full capacity while maintaining a high voice quality is extremely important for a CDMA service provider in terms of its revenue, customer satisfaction and reputation. As noted above, it is also desirable for the service provider to transmit BSMS messages and for the users to receive the BSMS messages. Accordingly, there is a desire and need to reduce the adverse impact on voice quality and system capacity attributable to the transmission of BSMS messages in a CDMA wireless telecommunications system.

SUMMARY OF THE INVENTION

In view of the foregoing shortcomings, and for other reasons, the present invention is directed to scheduling broadcast short message service (BSMS) messages in a manner that reduces the adverse impact on voice quality and system capacity, attributable to the transmission of the BSMS messages, in a wireless telecommunications system. The present invention comprises a computer implemented method and apparatus utilizing a quality of service (QoS) based broadcast message scheduler to negotiate and schedule the transmission times of the BSMS messages to the individual users in the system. The present invention also allows a user to tradeoff voice quality for broadcast capacity.

In one aspect of the present invention, a method for scheduling a transmission time of a message to be transmitted in a telecommunications system is provided. The method includes the steps of: computing a respective first message valid time period for at least one sector in the telecommunications system based on a length of the message, a second message valid time period and number of users in the respective at least one sector, said second message valid time period being associated with the message; and scheduling a respective transmission time of the message in the at least one sector based on the computed respective first message valid time period.

In another aspect of the present invention, a wireless telecommunications system is provided. The system includes: a mobile switching center, said mobile switching center including a first programmed processor for scheduling a transmission time of a message to be transmitted in said system and for computing a first message valid time period for a sector in said system based on a length of the message, a second message valid time period and number of users in the sector, said second message valid time period being associated with the message; and a base station coupled to said mobile switching center, said base station comprising a second programmed processor for scheduling a respective transmission time of the message for at least one user in the sector based on the computed first message valid time period.

It is an object of the present invention is to provide an apparatus for negotiating and scheduling the transmission times of BSMS messages to users in a wireless telecommunications system.

It is another object of the invention to provide an apparatus for negotiating and scheduling the transmission times of BSMS messages to users in a wireless telecommunications system that allows a user to tradeoff voice quality for broadcast capacity, if so desired.

It is a further object of the present invention to provide a method for negotiating and scheduling the transmission times of BSMS messages to users in a wireless telecommunications system.

It is yet another object of the invention to provide a method for negotiating and scheduling the transmission times of BSMS messages to users in a wireless telecommunications system that allows a user to tradeoff voice quality for broadcast capacity, if so desired.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 2:
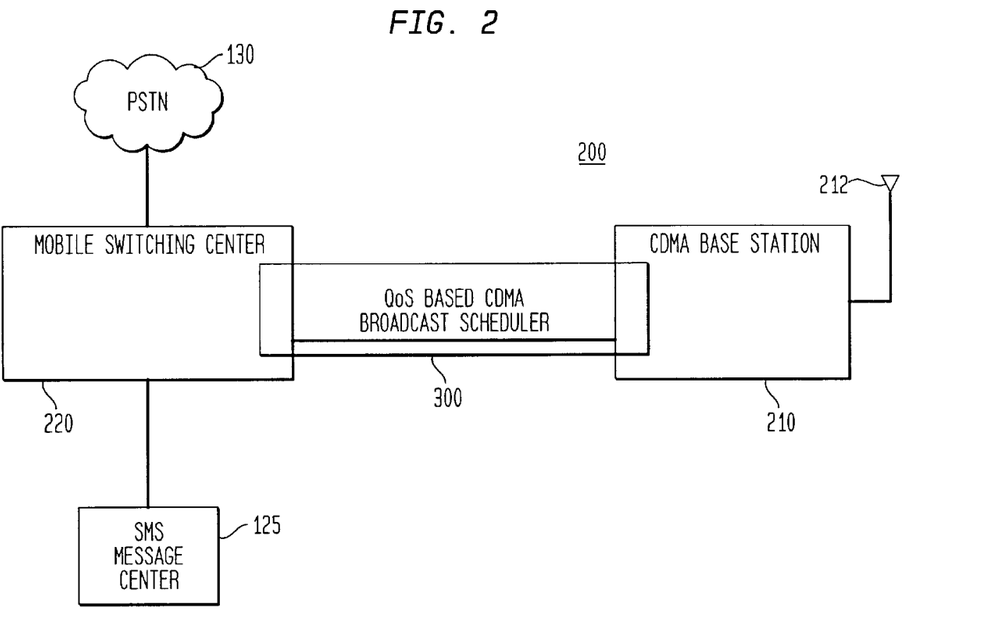
FIG. 2 is a block diagram illustrating a CDMA wireless telecommunications system constructed in accordance with an embodiment of the present invention.

FIG. 2 is a block diagram illustrating a CDMA wireless telecommunications system 200 constructed in accordance with an embodiment of the present invention. The system 200 contains a Mobile Switching Center (MSC) 220 and at least one CDMA base station 210. Each base station 210 has at least one antenna 212. The MSC 220 is connected to the base station 210, a Public Switched Telephone Network (PSTN) 130 and a short message service (SMS) message center (MC) 125. As discussed above with reference to FIG. 1, the SMS MC 125 provides SMS and broadcast short message service (BSMS) to the system 200. It should be appreciated that the exact architecture of the system 200, e.g., the number of base stations 210, is not important so long as the system 200 can provide CDMA wireless service to its users (via wireless terminals).

As will be discussed below, the system 200 is configured to provide a quality of service (QoS) based CDMA broadcast message scheduler 300 that negotiates and schedules the transmission time of BSMS messages to individual users of the system 200. As will become apparent, the system 200, via the scheduler 300, schedules the transmission times of the BSMS messages in a manner which reduces the impact on voice quality and system capacity attributable to the transmission of the BSMS messages. In addition, the system 200, via the scheduler 300, also allows a user to tradeoff voice quality for broadcast capacity, if so desired.

Figure 8:
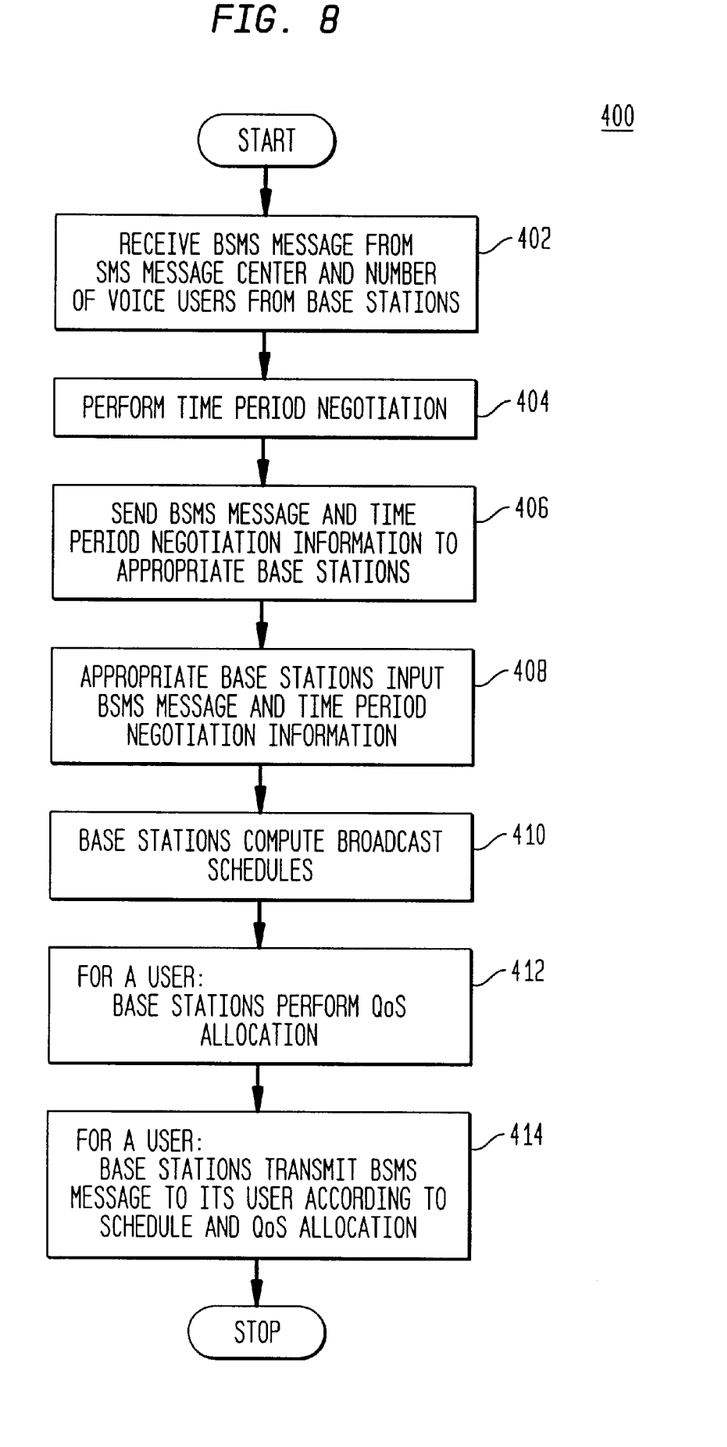
FIG. 8 is a flowchart illustrating an exemplary quality of service (QoS) based BSMS scheduling process performed by the present invention.

The present invention is implemented in software and is to be executed within each base station and MSC of a CDMA system. FIG. 8 is a flowchart illustrating an exemplary quality of service (QoS) based BSMS scheduling process 400 performed by the scheduler 300 (FIG. 2) of the present invention. The following description will presume that there is more than one base station and more than one sector in the CDMA system (described in more detail below). Initially, at step 402, the MSC inputs a BSMS message from the SMS message center. The message includes the text of the message, a validity/repetition time period for the message and a message length. The number of voice users in a sector is also received from each base station in the system, although this information does not have to be received at the exact moment that the BSMS message as long as the information accurately indicates the number of voice users in each sector. At step 404, the MSC performs the time period negotiation function to compute a validity/repetition time period for the message for each sector based on the information received from the base station and the information within the BSMS message. As will be described below in more detail, the computed validity/repetition time periods must be negotiated with, and accepted by, the SMS message center. If the computed validity/repetition time periods are not accepted, then the MSC will not process the BSMS message. If the computed validity/repetition time periods are accepted by the SMS message center, then the MSC will provide each base station in the system with the BSMS message information and the appropriate negotiated validity/repetition time period for the BSMS message (step 406).

Once the information is received by the base stations (step 408), each base station computes its broadcast schedule (i.e., computes a broadcast stagger time period) based on the received validity/repetition time period for the sector, message length and number of voice users in the sector (step 410). At this point, each base station in the system has a broadcast schedule that will stagger the transmission time of the BSMS message to each user to reduce the adverse impact on voice quality and system capacity, attributable to the transmission of the BSMS messages to every user in the system.

Once the base stations have computed their broadcast schedule in step 410, each base station performs QoS allocation for each of its users (step 412) and transmits the BSMS message to each user in accordance with the broadcast schedule (stagger time periods) and the QoS allocation (step 414). As will be described below in more detail, the QoS allocation allows the user to tradeoff voice quality for BSMS capacity of so desired.

Figure 3:
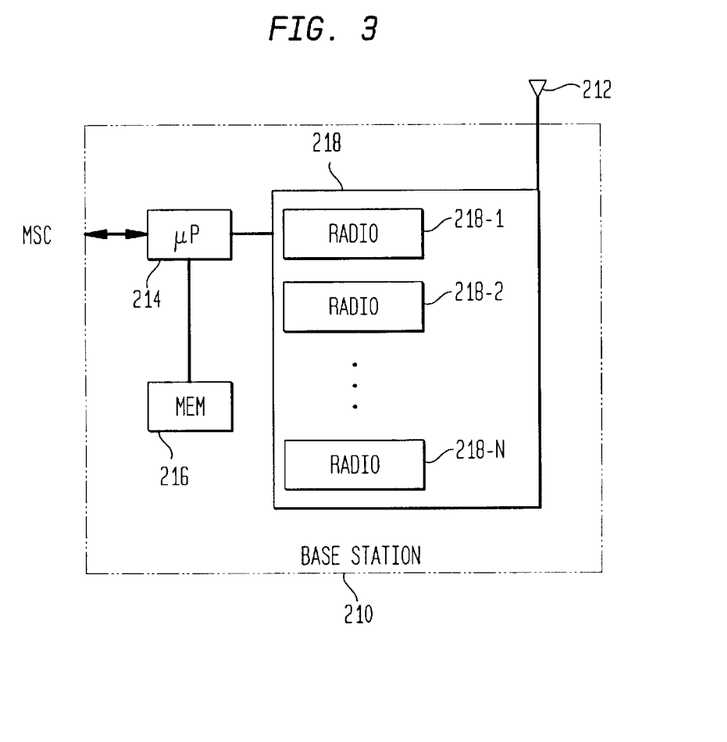
FIG. 3 is a block diagram illustrating an exemplary base station used in the CDMA wireless telecommunications system illustrated in FIG. 2.

FIG. 3 illustrates an exemplary base station 210. The base station 210 includes a microprocessor 214, memory circuit 216, antenna 212 and radio module 218 connected in the conventional manner. The radio module 218 contains a plurality of radios 218-1, 218-2 . . . 218-n. As known in the art, the microprocessor 214 is coupled to the memory 216, radio module 218 and is in communication with the MSC. As is also known in the art, the microprocessor 214 controls and coordinates the operations of the base station including, but not limited to, the call processing and power control functions while also communicating with the MSC. Thus, the microprocessor 214 serves as a controller for the base station 210. With the provision of some additional software, the microprocessor 214 will also implement a portion of the QoS based CDMA broadcast message scheduler 300 of the present invention (described below with reference to FIGS. 5–8).

Figure 4:
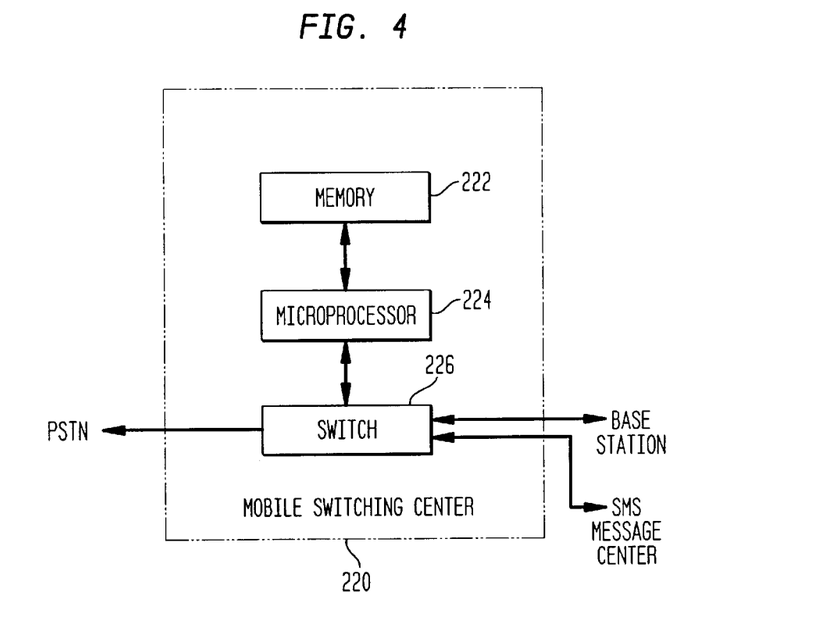
FIG. 4 is a block diagram illustrating an exemplary mobile switching center used in the CDMA wireless telecommunications system illustrated in FIG. 2.

FIG. 4 illustrates an exemplary MSC 220. The MSC 220 includes a memory circuit 222, microprocessor 224 and a cellular switch 226 connected in the conventional manner. As known in the art, the cellular switch 226 operates in conjunction with the microprocessor 224 to switch signals, such as overhead and traffic message signals, between the base station and the PSTN. According to the typical wireless network protocol, such as CDMA, the microprocessor 224 processes message signals received from, or for transmission to, a base station or the PSTN in order to establish a wireless communication linkage between the wireless terminals of system users. Thus, the microprocessor 224 serves as a controller for the MSC 220. With the provision of some additional software, the microprocessor 224 will also implement a portion of the QoS based CDMA broadcast message scheduler 300 of the present invention (described below with reference to FIGS. 5–8).

Figure 5:
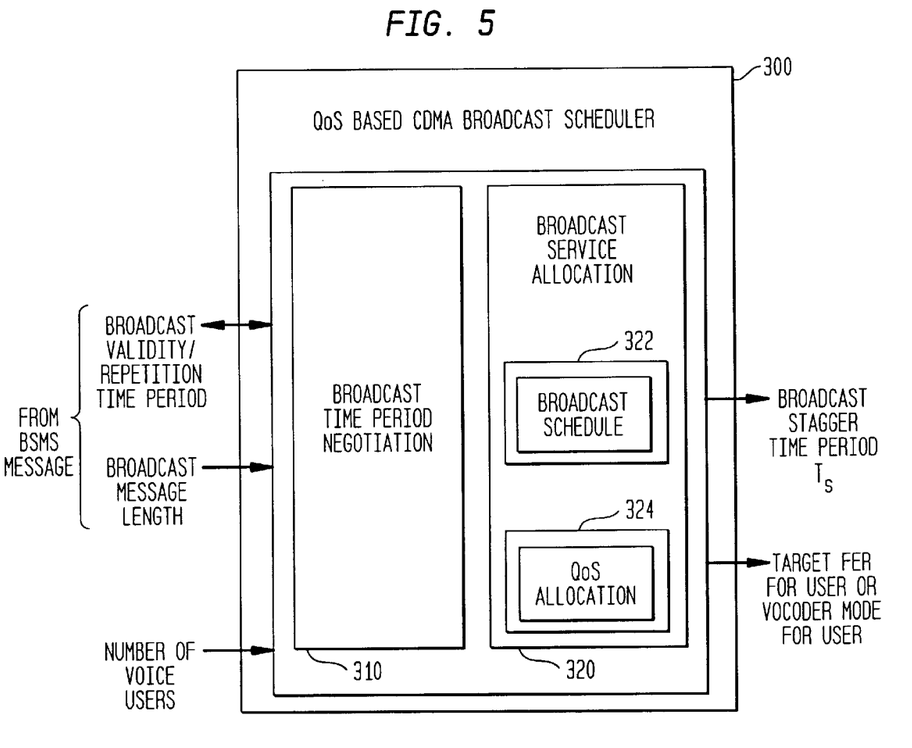
FIG. 5 is a high level block diagram illustrating exemplary functions performed by the present invention.
Figure 6:
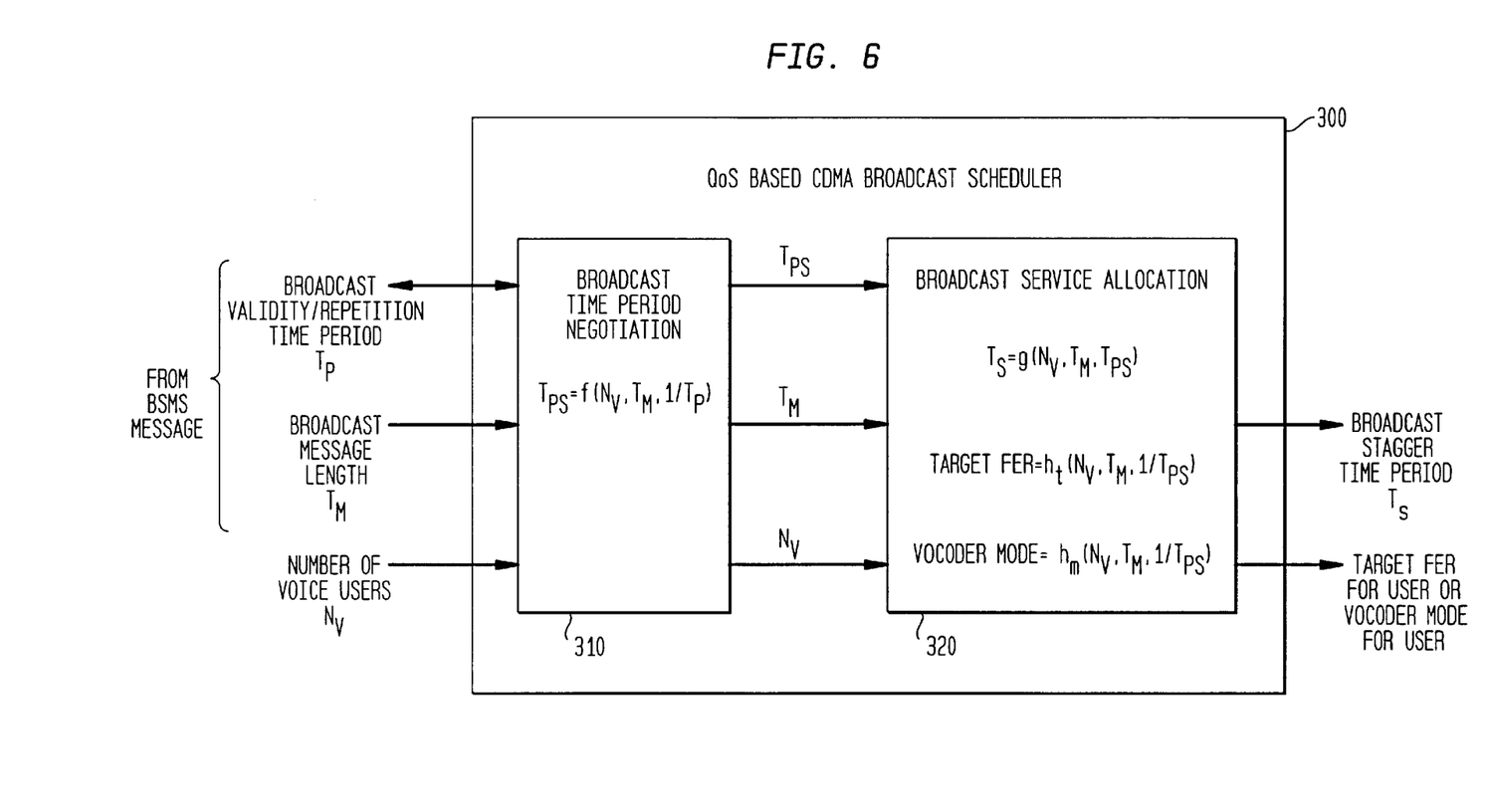
FIG. 6 is a block diagram illustrating exemplary functions performed by the present invention.
Figure 7:
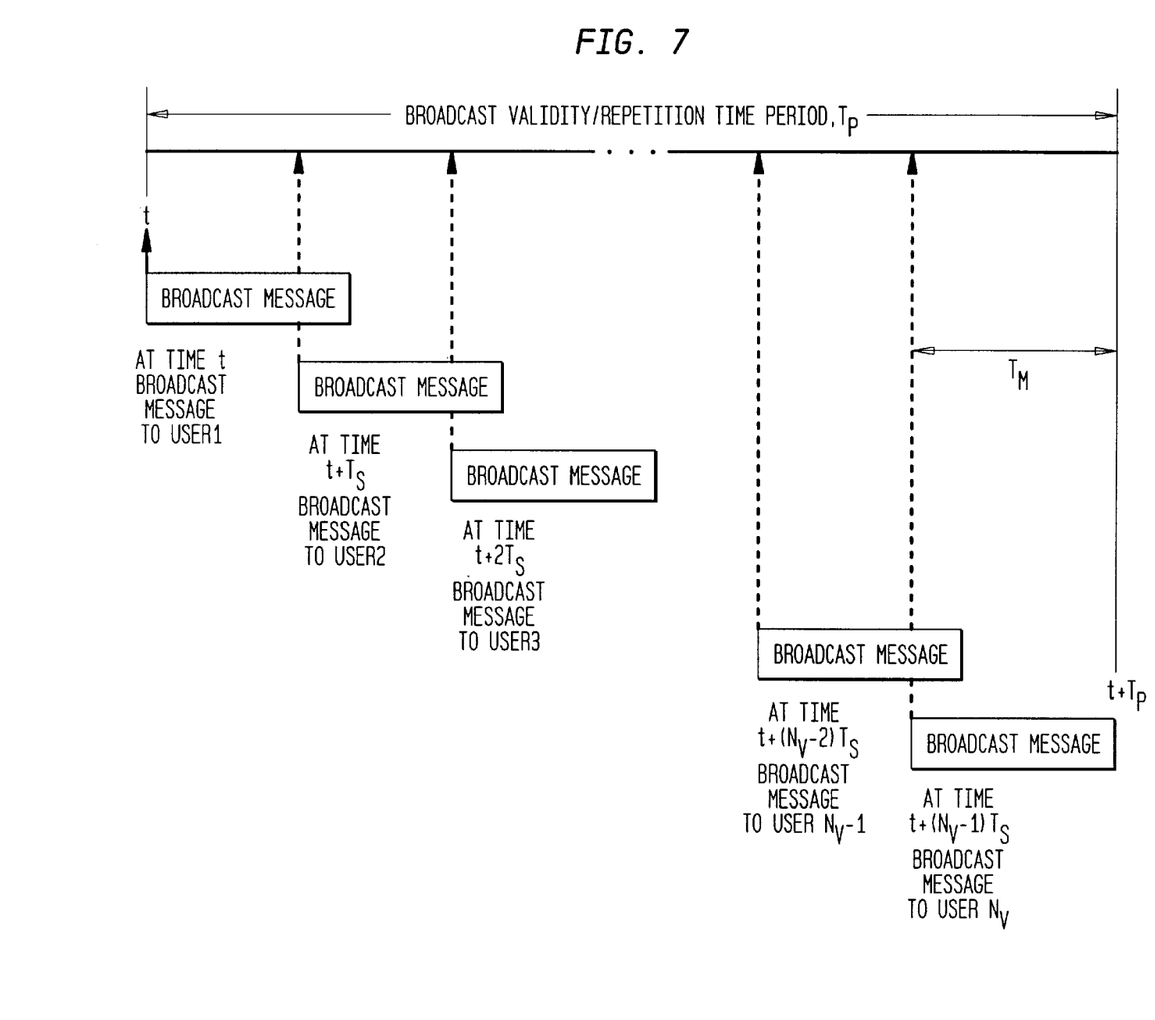
FIG. 7 is a diagram illustrating one example of a time staggered scheduling of a broadcast short message service (BSMS) message to individual users of the CDMA wireless telecommunications system illustrated in FIG. 2.

Referring now to FIGS. 5–7, a detailed description of the QoS based CDMA broadcast message scheduler 300 of the present invention now follows. Prior to discussing the scheduler 300 and its functions, the following background information is provided. As is conventionally known in the art, cells can consist of a single omni-directional antenna or they can contain numerous individual directional antennas, which when combined cover the geographical area of the cell. Each directional antenna transmits and receives energy within a specified area of the cell. This area is commonly referred to as a sector. Thus, a cell can be divided into several sectors. The scheduler 300 of the present invention operates on each sector within a CDMA wireless telecommunications system 200 (FIG. 2).

The QoS based CDMA broadcast message scheduler 300 can be broken down into two main functions, broadcast time period negotiation 310 and broadcast service allocation 320. Broadcast service allocation 320 comprises two sub-functions, broadcast schedule 322 and QoS allocation 324. As will be described below, broadcast time period negotiation 310 negotiates, on a per sector basis, a broadcast validity/repetition time period for each BSMS message received from the SMS message center. Broadcast service allocation 320 determines a broadcast stagger time period used to schedule the transmission of the BSMS message to the system users in a staggered manner to distribute the load associated with the BSMS message throughout the negotiated broadcast validity/repetition time period. In addition, broadcast service allocation 320 allows tradeoffs of voice quality for broadcast capacity on a per user basis.

It is desirable that the broadcast time period negotiation 310 be performed on the MSC, while the broadcast service allocation 320 is performed on each base station within the CDMA system. Inputs into the scheduler 300, particularly to the broadcast time period negotiation 310 function, include the BSMS message from the SMS message center and the number of voice users $N_V$ in a sector received from each base station of the system. Each sector, for example, can communicate the number of voice users $N_V$ in its sector to the MSC via a message. Each BSMS message includes the text of the message (not shown), a validity/repetition time period $T_P$ for the message and a message length $T_M$. Outputs from the scheduler 300, particularly from the broadcast service allocation function 320, include a broadcast stagger time period $T_S$ for the transmission of the BSMS message in a particular sector and the target frame error rate (FER) or vocoder mode for individual users within the sector.

The broadcast time period negotiation 310 function of the QoS based CDMA broadcast message scheduler 300 operates as follows. A BSMS message is received from the SMS message center. As stated above, the message includes the text of the message (not shown), a validity/repetition time period $T_P$ for the message and a message length $T_M$. As known in the art, the validity time period of the BSMS message is the time period in which the message must be sent for the information within the message to be considered valid. Likewise, repetition time period is validity period for a BSMS message that should be broadcast repetitively (that is, the BSMS message should be re-transmitted X number of times, each transmission having its own validity period, which commences after the prior validity period expires).

The number of voice users $N_V$ in a sector is received from each base station. It should be appreciated that the number of voice users $N_V$ does not have to be received at the same time as the BSMS message is received, but it should be received periodically to ensure its accuracy.

Once the BSMS message has been received and the number of voice users $N_V$ in a sector is determined for each sector, the validity/repetition time period $T_p$ for the BSMS message is negotiated and computed for each sector within the system as follows. The broadcast time period negotiation 310 determines if the BSMS message can be transmitted as requested by the SMS message center and if it cannot be transmitted as requested, suggests a revised transmission time to the SMS message center based upon broadcast load admission thresholds of the sectors.

It is desirable for the per sector validity/repetition time period $T_{PS}$ to be expressed as a function of the number of voice users $N_V$ in a sector, message length $T_M$, and the validity/repetition time period $T_P$ for the message, denoted herein as $f(N_V, T_M, 1/T_P)$. For example, the per sector validity/repetition time period $T_{PS}$ can be computed as follows:

$$T_{PS} = f(N_V, T_M, 1/T_P) = f'(N_V \cdot T_M/T_P),$$

where $T_{PS}$ is calculated for each sector and $N_V \cdot T_M/T_P$ represents the measure of broadcast load per sector. An exemplary calculation for the functions $f(N_V, T_M, 1/T_P)$ and $f'(N_V \cdot T_M/T_P)$ would be $T_N \cdot N_V \cdot T_M/T_P$, where $T_N$ is a time value decided by the MSC. It should be noted that the above equation is one example of computing the validity/repetition time period $T_{PS}$, and the invention is not to be limited to solely this equation. It is desired that, after this computation, the maximum validity/repetition time period from what is proposed by the MSC and what is computed is then used as the $T_{PS}$. Once each validity/repetition time period $T_{PS}$ are computed, they are either accepted or revised based on broadcast load admission thresholds for the respective sectors. Once the validity/repetition time period $T_{PS}$ of the BSMS message for each sector is accepted, it is passed to the broadcast service allocation 320 function, along with the number of voice users $N_V$ in a sector (optional), message length $T_M$, and the text of the BSMS message (not shown).

Each broadcast service allocation 320 function operates on the received information to compute a broadcast stagger time period $T_S$ used to schedule the transmission of the BSMS message to the system users in a staggered manner to distribute the load associated with the BSMS message throughout the negotiated broadcast validity/repetition time period $T_{PS}$ (performed by the broadcast schedule 322 function). In addition, the QoS allocation 324 function of the broadcast service allocation 320 functions allows tradeoffs of voice quality for broadcast capacity on a per user basis.

The broadcast schedule 322 function staggers the transmission times of the BSMS to each of the users in the sector. This reduces the impact on voice quality and system capacity typically attributable to the transmission of the BSMS messages. It is desirable for the broadcast stagger time period $T_S$ for each sector to be expressed as a function of the number of voice users $N_V$ in the sector, message length $T_M$, and the per sector validity/repetition time period $T_{PS}$ negotiated by the broadcast time period negotiation 310 function, denoted herein as $g(N_V, T_M, T_{PS})$. For example, the broadcast stagger time period $T_S$ for each sector can be computed as follows:

$$T_S = g(N_V, T_M, T_{PS}) = (T_{PS} - T_M)/(N_V - 1),$$

where the broadcast stagger time period $T_S$ is calculated for each sector. Once computed, the broadcast stagger time period $T_S$ may be used to schedule the transmission of the BSMS message to the users of the system. The order of transmissions to the users may be random or determined by availability of low rate speech frames for the individual users. FIG. 7 is a diagram illustrating the time staggered scheduling of the BSMS message to the individual users of the sector based upon the above-mentioned equation. It should be noted, however, that the above equation used to compute the broadcast stagger time period $T_S$ is one example and that the invention is not to be limited to this one equation.

The QoS allocation 324 function takes into account that a user may desire more BSMS capacity and is willing to tradeoff voice quality to receive it. Each user subscribes to a service plan offered by the service provider. The amount of tradeoff is dependent upon the service plan chosen by the user. The tradeoff can be accomplished by QoS allocation 324 in two ways.

One way is to allocate a target FER on a need basis per user and increase the FER to accommodate more BSMS message capacity. That is, by increasing the FER of the voice information transmitted to the user, less voice information will be transmitted. This frees up more space in the transmission frames for that user. The extra space can be used for BSMS information (i.e., increases the BSMS capacity). Target FER can be expressed as a function of the number of voice users $N_V$ in the sector, message length $T_M$, and the per sector validity/repetition time period $T_{PS}$ negotiated by the broadcast time period negotiation 310 function, denoted herein as $h_t(N_V, T_M, 1/T_{PS})$. That is, the target FER is a function of voice load (e.g., $N_V$) and broadcast load (e.g., $T_M/T_{PS}$). It should be noted that the invention is not to be limited to any particular formulation or equation for $h_t$ as long as its computation is a function of voice load and broadcast load. As known in the art, the power control process of the base station would adjust the target FER on a per user basis.

A second way to accomplish the tradeoff of voice quality for BSMS message capacity is to allocate a user's vocoder mode to decrease voice quality and thus, increase BSMS message capacity. That is, by setting the vocoder mode to a decreased voice quality, less voice information is transmitted to the user. This frees up more space in the transmission frames for that user. The extra space can be used for BSMS information (i.e., increases the BSMS capacity). Each user's vocoder mode can be expressed as a function of the number of voice users $N_V$ in the sector, message length $T_M$, and the per sector validity/repetition time period $T_{PS}$ negotiated by the broadcast time period negotiation 310 function, denoted herein as $h_m(N_V, T_M, 1/T_{PS})$. That is, each user's vocoder mode is a function of voice load (e.g., $N_V$) and broadcast load (e.g., $T_M/T_{PS}$). It should be noted that the invention is not to be limited to any particular formulation or equation for $h_m$ as long as its computation is a function of voice load and broadcast load.

The present invention is implemented in software and the software instructions and data can be stored in PROM, EEPROM or other non-volatile memory of the mobile switching center and base stations. The present invention can be stored on a hard drive, floppy disc, CD-ROM or other permanent or semi-permanent storage medium and subsequently transferred to the memory of the mobile switching center and base stations. The program embodying the present invention can also be divided into program code segments, downloaded, for example, from a server computer or transmitted as a data signal embodied in a carrier wave to the mobile switching center and base stations as is known in the art. In addition, the present invention can be implemented in hardware or a combination of hardware and software. In particular, the present invention can be implemented in an application specific integrated circuit (ASIC).

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method for scheduling a transmission time of a message to be transmitted in a telecommunications system, said method comprising the steps of:
   computing a respective first message valid time period for at least one sector in the telecommunications system based on a length of the message, a received second message valid time period and number of users in the respective at least one communication area, said second message valid time period being associated with the message; and
   scheduling a respective transmission time of the message in the at least one communication area based on the computed respective first message valid time period.

2. The method of claim 1 wherein said scheduling step schedules a respective transmission time of the message for a plurality of users in the at least one communication area.

3. The method of claim 2 wherein said scheduling step schedules the respective transmission time of the message for the plurality of users in a time staggered manner.

4. The method of claim 1 further comprising the step of modifying the respective transmission time of the message for at least one user in a communication area based on a respective desired voice signal quality of service requirement of the at least one user.

5. The method of claim 4 wherein the quality of service requirement is frame error rate of a voice signal transmitted to the at least one user.

6. The method of claim 4 wherein the quality of service requirement is vocoder mode of a voice signal transmitted to the at least one user.

7. The method of claim 1 wherein the message is a broadcast short service message received from a short message service center.

8. The method of claim 7 wherein said computing step further comprises determining the length of the message and the second received message valid time period from the short service message.

9. The method of claim 8 wherein said computing step further comprises receiving the number of users in the at least one communication area from a respective base station.

10. The method of claim 7 further comprising the step of negotiating each computed first message valid time period with the short message service.

11. A method of scheduling a transmission time of a short message service message to be transmitted to at least one user of a telecommunications system, said method comprising the steps of:
   determining a message length and first message valid time period from the short service message;
   determining a respective number of users in at least one sector of the telecommunications system;
   computing a respective received second message valid time period for the at least one communication area based on the message length, first message valid time period and number of users in the respective communication area; and
   scheduling a respective transmission time of the message for at least one user in the at least one communication area based on the respective computed second message valid time period.

12. The method of claim 11 wherein said scheduling step schedules a respective transmission time of the message for a plurality of users in the at least one communication area.

13. The method of claim 12 wherein said scheduling step schedules the respective transmission time of the message for the plurality of users in a time staggered manner.

14. The method of claim 11 further comprising the step of modifying the respective transmission time of the message for the at least one user based on a respective desired voice signal quality of service requirement of the at least one user.

15. The method of claim 14 wherein the quality of service requirement is frame error rate of a voice signal transmitted to the at least one user.

16. The method of claim 14 wherein the quality of service requirement is vocoder mode of a voice signal transmitted to the at least one user.

17. A wireless telecommunications system comprising:
   a mobile switching center, said mobile switching center including a first programmed processor for scheduling a transmission time of a message to be transmitted in said system and for computing a first message valid time period for a communication area in said system based on a length of the message, a second received message valid time period and number of users in the communication area, said second received message valid time period being associated with the message; and
   a base station coupled to said mobile switching center, said base station comprising a second programmed processor for scheduling a respective transmission time of the message for at least one user in the communication area based on the computed first message valid time period.

18. The system of claim 17 wherein said second programmed processor schedules a respective transmission time of the message for a plurality of users in the communication area.

19. The system of claim 18 wherein said second programmed processor schedules the respective transmission time of the message for the plurality of users in a time staggered manner.

20. The system of claim 17 wherein said second programmed processor modifies the respective transmission time of the message of the at least one user based on a respective desired voice signal quality of service requirement of the at least one user.

21. The system of claim 20 wherein the quality of service requirement is frame error rate of a voice signal transmitted to the at least one user.

22. The system of claim 20 wherein the quality of service requirement is vocoder mode of a voice signal transmitted to the at least one user.

23. The system of claim 17 wherein said mobile switching center is coupled to a short message service center and the message is a broadcast short service message received from the short message service center.

24. The system of claim 23 wherein said first programmed processor determines the length of the message and the second received message valid time period from the short service message.

25. The system of claim 24 wherein said first programmed processor receives the number of users in the communication area from said base station.

26. The system of claim 23 wherein said first programmed processor negotiates the computed first message valid time period with the short message service.

27. The system of claim 17 wherein said system is a CDMA wireless telecommunications system.

28. A wireless telecommunications system comprising:
a mobile switching center, said mobile switching center comprising a first controller, said first controller computing a respective first message valid time period for at least one sector in said system based on a length of a received message, a second received message valid time period and number of users in the respective at least one communication area; and
a base station coupled to said mobile switching center, said base station comprising a second controller, said second controller scheduling a respective transmission time of the message for at least one user in the at least one communication area based on the respective computed first message valid time period.

29. The method of claim 1, wherein said computing step further comprises negotiation of a suggested valid time period with a message center, and acceptance of the suggested time period by the message center.

30. The method of claim 1, wherein said scheduling step further comprises trading off of voice quality with broadcast quality.

31. The system of claim 23, wherein said broadcast short service message is repetitively broadcast.

* * * * *